(12) United States Patent
Baker

(10) Patent No.: US 9,630,552 B1
(45) Date of Patent: Apr. 25, 2017

(54) VEHICLE SPEED DISPLAY

(71) Applicant: Michael Baker, St. Petersburg, FL (US)

(72) Inventor: Michael Baker, St. Petersburg, FL (US)

( * ) Notice: Subject to any disclaimer, the term of this patent is extended or adjusted under 35 U.S.C. 154(b) by 0 days.

(21) Appl. No.: 14/798,666

(22) Filed: Jul. 14, 2015

(51) Int. Cl.
*B60Q 1/54* (2006.01)
*B60R 16/023* (2006.01)
*G01S 19/13* (2010.01)

(52) U.S. Cl.
CPC ............ *B60Q 1/54* (2013.01); *B60R 16/023* (2013.01); *G01S 19/13* (2013.01)

(58) Field of Classification Search
CPC ........................................................ B60Q 1/54
USPC ................................................. 340/466, 463
See application file for complete search history.

(56) References Cited

U.S. PATENT DOCUMENTS

| | | | |
|---|---|---|---|
| 3,007,435 A | 11/1961 | Peterson | |
| 5,656,992 A * | 8/1997 | McNeill | B60Q 1/54 340/441 |
| 6,335,681 B1 * | 1/2002 | Ontiveros | B60K 31/18 340/457 |
| 6,449,889 B1 | 9/2002 | Hottenstein | |
| 6,718,667 B2 | 4/2004 | Applebee | |
| 6,860,047 B1 | 3/2005 | Rodriguez | |
| 7,884,784 B2 | 2/2011 | Repetto | |
| 8,006,419 B2 | 8/2011 | Kabalka | |
| D672,396 S | 12/2012 | Nadeau | |
| 8,459,850 B2 * | 6/2013 | Herberholt | B60Q 1/2615 362/542 |
| 2003/0234724 A1 * | 12/2003 | Chiu | B60Q 1/34 340/464 |
| 2006/0220820 A1 * | 10/2006 | Taylor | B60Q 1/54 340/466 |
| 2012/0072087 A1 * | 3/2012 | Wu | B60Q 1/54 701/70 |

FOREIGN PATENT DOCUMENTS

EP 0177134 A2 4/1986

\* cited by examiner

*Primary Examiner* — Toan N Pham

(57) ABSTRACT

The vehicle speed display is a device that is adapted to be mounted on the window of an automobile that publically displays the current speed of the automobile. This public display of speed is used to send a calming signal aggressive drivers that the lead car is maintaining their speed under the legal speed limit. The vehicle speed display comprises a logic module, a display module, a power module and a housing.

4 Claims, 5 Drawing Sheets

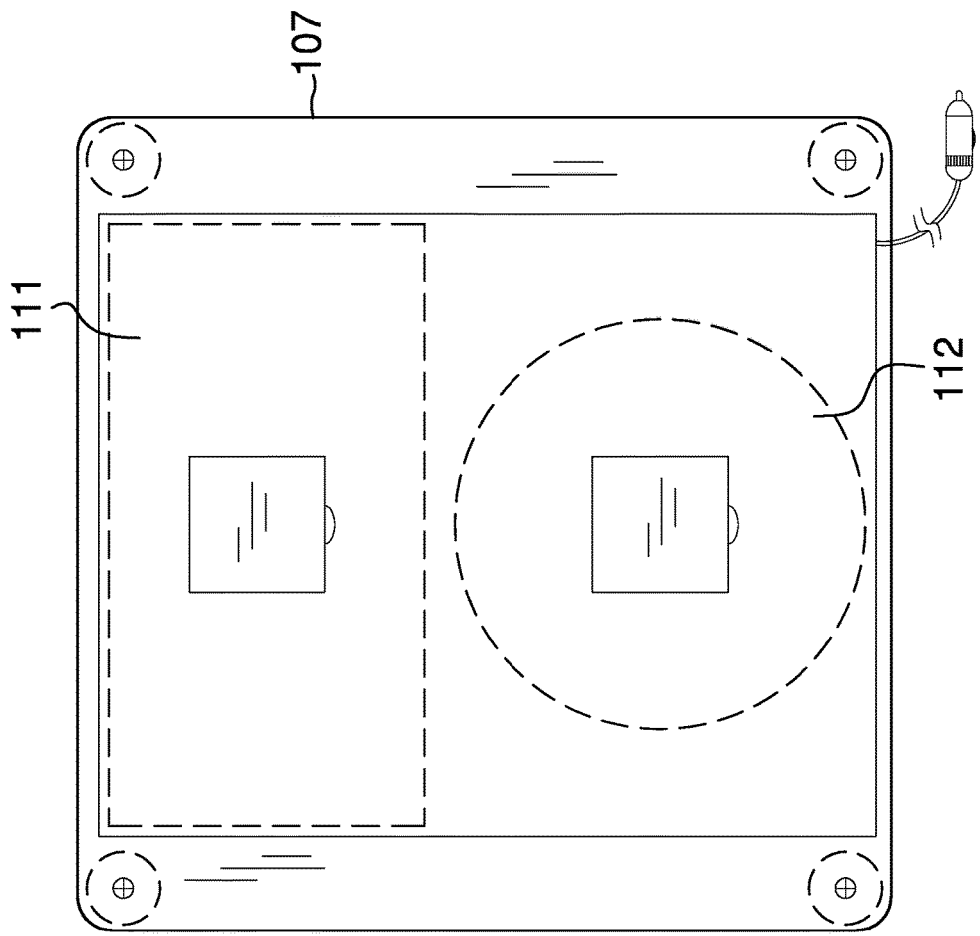
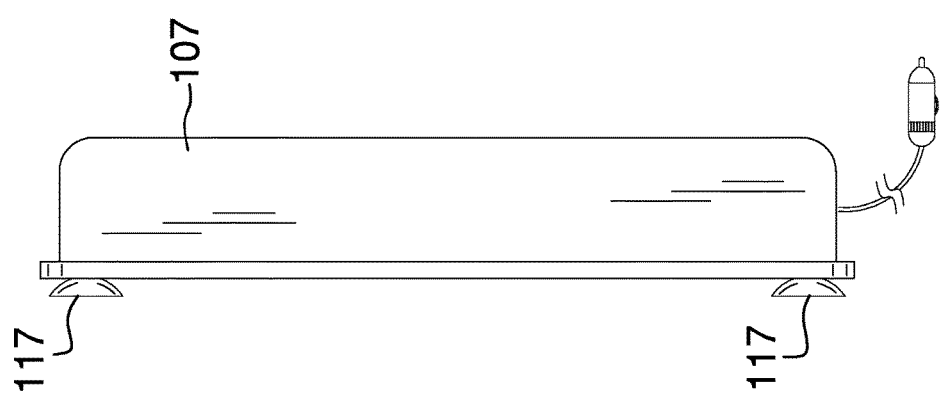

VEHICLE SPEED DISPLAY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of speed indication and speed measuring devices, more specifically, a device configured for use in publically displaying the speed of a moving vehicle.

Tailgating is defined as a first moving vehicle following a second moving vehicle too closely thereby increasing the risk of a rear end collision. Tailgating can occur inadvertently when drivers do not realize they are following a vehicle too closely. Tailgating can also occur because of aggressive or reckless driving and, depending on the mental state of the following driver, can escalate into dangerous situations.

SUMMARY OF INVENTION

The above situation is addressed in the present disclosure. The vehicle speed display is a device that is adapted to be mounted on the window of an automobile that publically displays the current speed of the automobile. This public display of speed is used to send a calming signal aggressive drivers that the lead car is maintaining their speed under the legal speed limit.

These together with additional objects, features and advantages of the vehicle speed display will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle speed display in detail, it is to be understood that the vehicle speed display is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle speed display.

It is therefore important that the claims be regarded as including such equivalent construction insofar as they do not depart from the spirit and scope of the vehicle speed display. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a side view of an embodiment of the disclosure.
FIG. 3 is a rear view of an embodiment of the disclosure.

DETAILED DESCRIPTION OF THE EMBODIMENT

Figure 1:
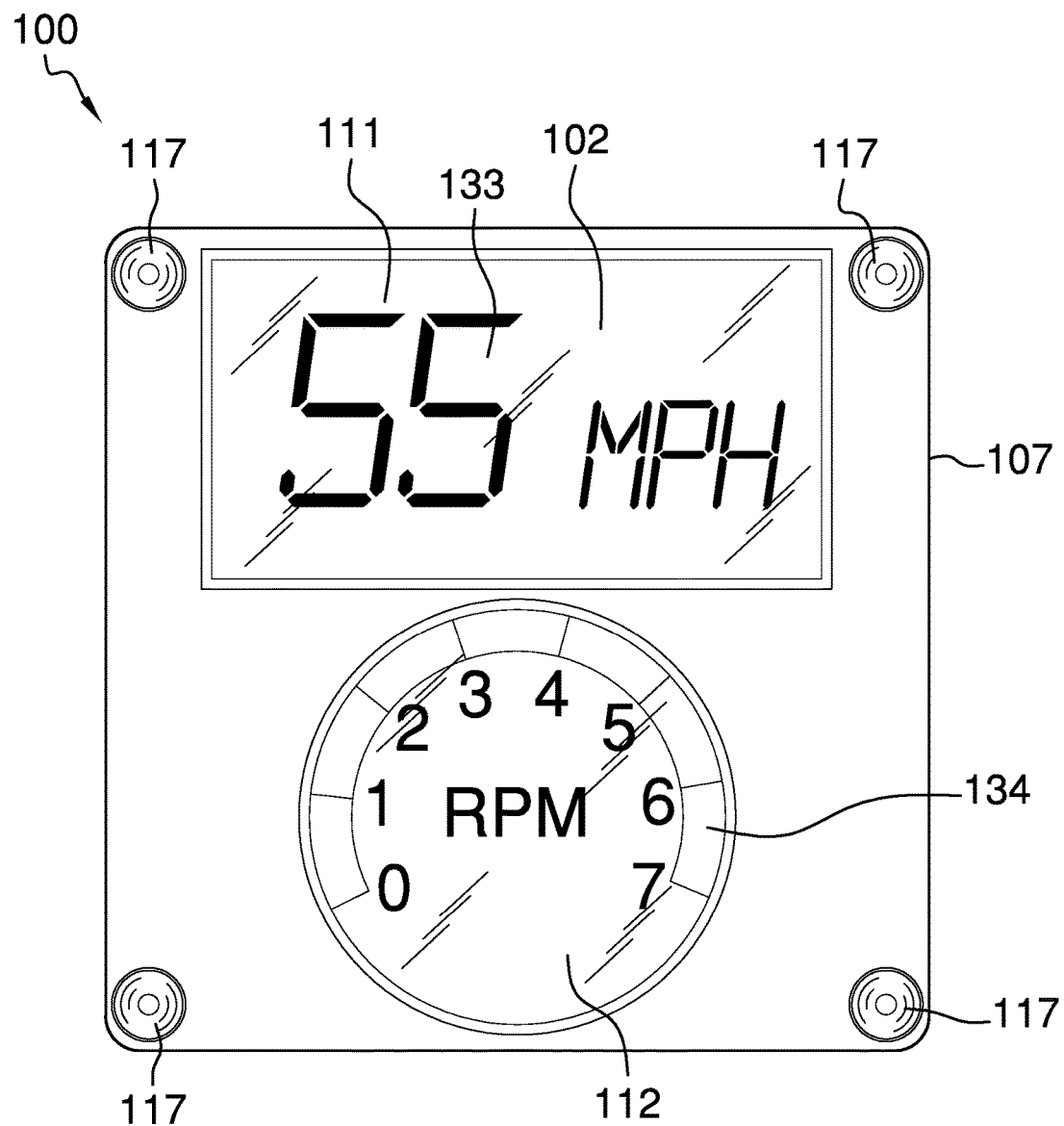
FIG. 1 is a front view of an embodiment of the disclosure.
Figure 4:
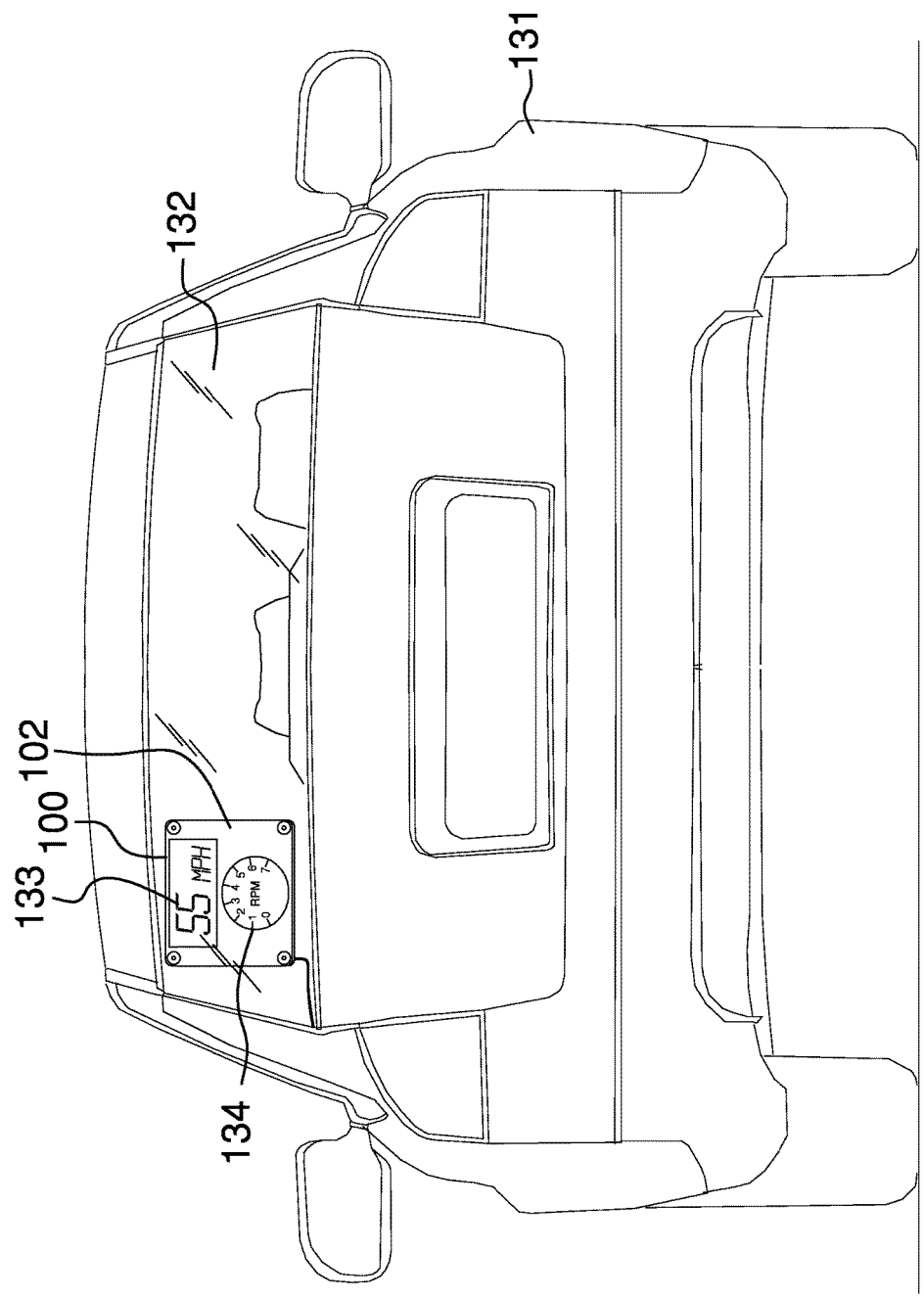
FIG. 4 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to multiple potential embodiments of the disclosure, which are illustrated in FIGS. 1 through 7B. The vehicle speed display 100 (hereinafter invention) comprises a logic module 101, a display module 102, a power module 103 and a housing 107.

The logic module 101 is a microcontroller that receives speed information 133 about the automobile 131, processes this information and sends this information to the display module 102 for display. In the first, second, third, and fourth potential embodiments of the disclosure, the logic module 101 used was a readily and commercially available Arduino microcontroller.

The display module 102 is a visual output device that displays the speed information 133 about the automobile 131 that is received from the logic module 101. In the first and third potential embodiments of the disclosure, the display module 102 is an LED display 111. Suitable LED displays 111 include, but are not limited to, a scrolling LED display 111 or a more traditional 12 pin LED display 111. Both types of LED displays 111 are readily and commercially available. In the second and fourth potential embodiments of the disclosure, the display module 102 is an LCD display 112. LCD displays 112 are readily and commercially available.

The power module 103 provides the energy required to operate the logic module 101, the display module 102, and the other elements required to operate the invention 100. The other elements required to operate the invention 100 are discussed elsewhere in this disclosure. In the first and second potential embodiments of the disclosure, the power module 103 is wired into the automobile's 131 electrical system. In the third and fourth potential embodiments of the disclosure, the power module 103 is based on a battery 113. The design and implementation of power systems, both hardwired and battery based, are well known and documented in the electrical arts.

The housing 107 is a rigid container that is used to contain and protect the logic module 101, the power module 103 and the other elements required to operate the invention 100. The display module 102 is mounted on the housing 107 so that it is visible. In the first, second, third, and fourth potential embodiments of the disclosure, a commercially available housing is used.

Figure 5:
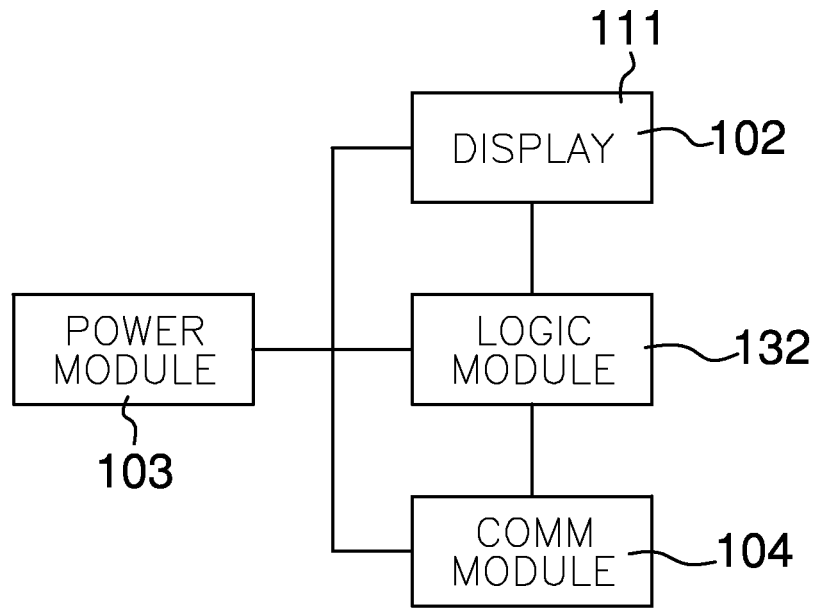
FIG. 5 is a block diagram of an embodiment of the disclosure.

In the first potential embodiment of the disclosure, most clearly illustrated in FIG. 5, the invention 100 further comprises a communication module 104. The purpose of the communication module 104 is to receive speed information 133 about the automobile 131 directly from the automobile 131 and to forward this information to the logic module 101 for processing. Optionally, tachometer information 134 can also be provided to the communication module 104 by the automobile 131. The communication module 104 can be connected with wires into the electronic system of the automobile 131 or the communication module 104 can communicate wirelessly with the electronic system of the automobile 131. In the first potential embodiment of the disclosure, the display module 102 is an LED display 111 and the power module 103 is wired directly into the automobile 131 electrical system.

In a second potential embodiment of the disclosure, most clearly illustrated in FIG. 5, the invention 100 further comprises a communication module 104. The purpose of the communication module 104 is to receive speed information 133 about the automobile 131 directly from the automobile 131 and to forward this information to the logic module 101 for processing. Optionally, tachometer information 134 can also be provided to the communication module 104 by the automobile 131. The communication module 104 can be connected with wires into the electronic system of the automobile 131 or the communication module 104 can communicate wirelessly with the electronic system of the automobile 131. In the first potential embodiment of the disclosure, the display module 102 is an LCD display 112 and the power module 103 is wired directly into the automobile 131.

Figure 6:
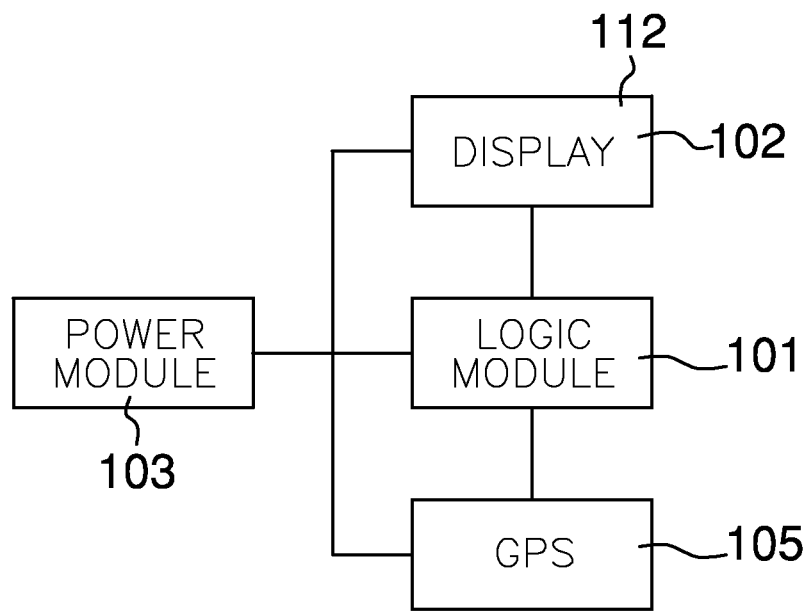
FIG. 6 is a block diagram of an alternate embodiment of the disclosure.
Figure 7:
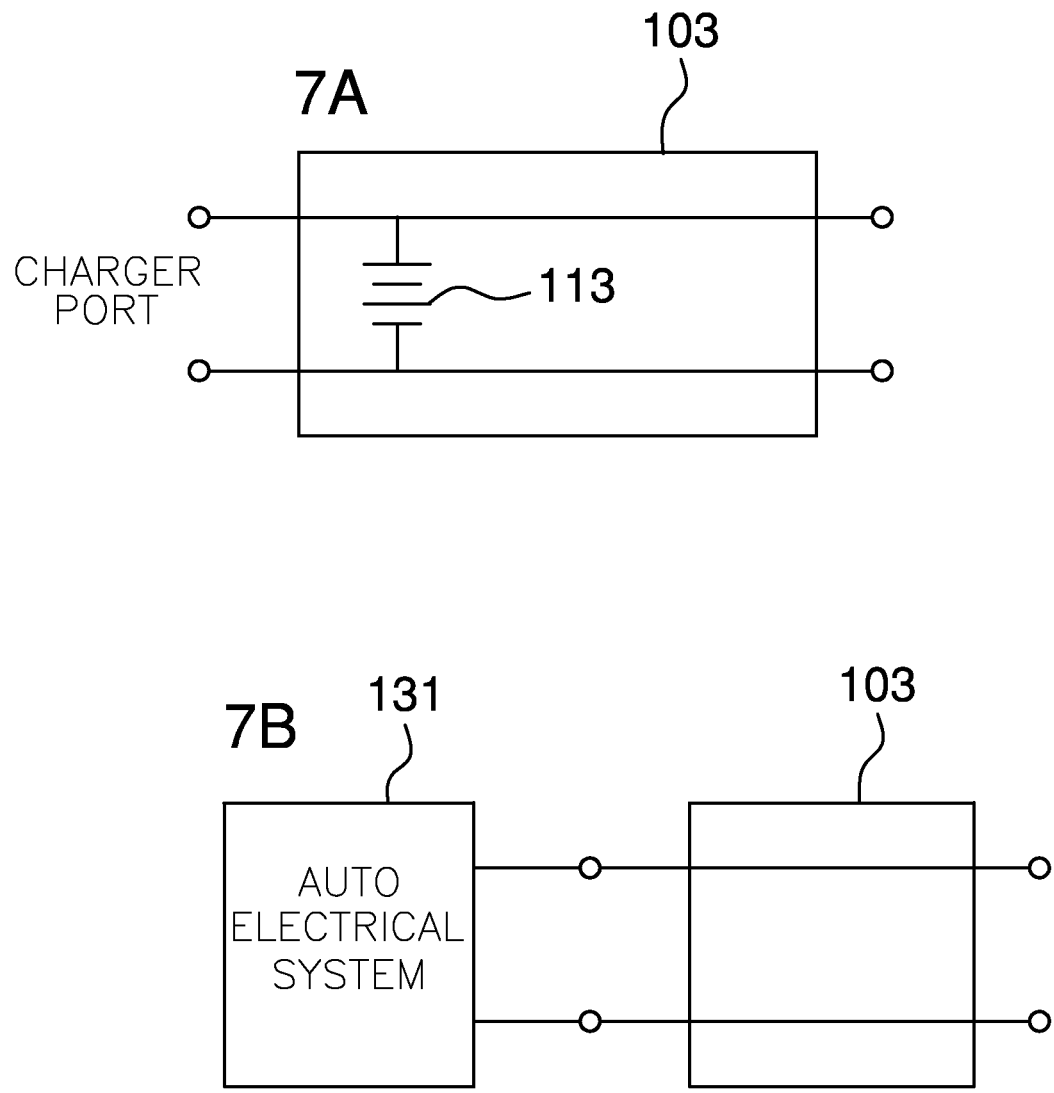
FIG. 7A is a schematic diagram of an embodiment of the disclosure.
FIG. 7B is another schematic diagram of an embodiment of the disclosure.

In a third potential embodiment of the disclosure, most clearly illustrated in FIG. 6, the invention 100 further comprises a global positioning system module 105 (hereinafter GPS module). The purpose of the GPS module 105 is to continuously track the position of the automobile 131 using the GPS system. This information is forwarded to the logic module 101 for processing. The logic module 101 uses the position information provided by the GPS module 105 to calculate the speed of the automobile 131 and forward this information to the display module 102. In the third potential embodiment of the disclosure, the display module 102 is an LED display 111 and the power module 103 is battery 113 based.

In a fourth potential embodiment of the disclosure, most clearly illustrated in FIG. 5, the invention 100 further comprises a GPS module 105. The purpose of the GPS module 105 is to continuously track the position of the automobile 131 using the GPS system. This information is forwarded to the logic module 101 for processing. The logic module 101 uses the positioning information provided by the GPS module 105 to calculate the speed of the automobile 131 and forward this information to the display module 102. In the fourth potential embodiment of the disclosure, the display module 102 is an LCD display 112 and the power module 103 is battery 113 based.

In a fifth potential embodiment of the disclosure, most clearly illustrated in FIG. 1, the display module 102 uses both an LED display 111 and an LCD display. The fifth potential embodiment of the disclosure uses the communication module 104 to receive speed information 133 and tachometer information 134 about the automobile 131 directly from the electronic system of the automobile 131. The speed information is displayed using the LED module 111 and the tachometer information 134 is displayed using the LCD display 112.

The invention 100 is attached to the window 132 for the display using readily and commerically available suction cups 117. Alternatively, the invention 100 can be incorporated directly into the window 132 of an automobile 131 during the manufacture of the window 132.

The following definitions were used in this disclosure:

Automobile: As used in this disclosure, an automobile is a road vehicle that is powered by an internal combustion engine. This definition is specifically intended to include vehicles generally referred to as pickup trucks.

LCD: As used in this disclosure, LCD is an acronym for Liquid Crystal Display. A liquid crystal display comprises a liquid crystal film placed between two sheets of transparent material. The visual characteristics of the can be varied through the application of a voltage.

LED: As used in this disclosure, an LED is an acronym for a light emitting diode. A light emitting diode is a 2 lead semiconductor that is also a light source.

Logic Module: As used in this disclosure, a logic module is a programmable device that accepts digital and analog inputs, processes the digital and analog inputs according to previously stored instruction and to provide the results of these instructions as digital or analog outputs. Processor, microprocessors, and microcontrollers are synonyms.

Microcontroller: As used in this disclosure, a microcontroller is a small computer, often on a single integrated circuit, containing a processor core, memory, and programmable input/output peripherals.

With respect to the above description, it is to be realized that the optimum dimensional relationship for the various components of the invention described above and in FIGS. 1 through 7B, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A display device comprising:
a logic module and a display module;
wherein the display device is adapted for use with an automobile;

wherein the logic module provides speed information about the automobile to the display module;
wherein the display module is publicly visible;
wherein the display module displays the speed information about the automobile;
wherein the display device is attached to a window of the automobile;
wherein the display device is attached to the window of the automobile using suction cups;
wherein the logic module is a microcontroller;
wherein the logic module receives the speed information about the automobile from an external module;
wherein the logic module processes the speed information about the automobile sends this information to the display module;
wherein the display module is a visual output device;
wherein the power module provides an energy required to operate the logic module and the display module;
wherein the power module is wired into an automobile's electrical system;
wherein the display device further comprises a communication module;
wherein the display device further comprises a GPS module;
wherein the GPS module continuously tracks a position of the automobile;
wherein the position information is forwarded to the logic module;
wherein the logic module uses the position information provided by the GPS module to calculate the speed information of the automobile;
wherein the display module further comprises an LED display and an LCD display;
wherein the power module is a battery based design;
wherein the communication module is wired directly into the automobile's electronic system;
wherein the communication module receives the speed information about the automobile from the automobile's electronic system;
wherein the communication module forwards the speed information about the automobile to the logic module.

2. The display device according to claim 1 wherein the communication module is wired directly into the automobile's electronic system;
wherein the communication module receives the speed information about the automobile from the automobile's electronic system;
wherein the communication module forwards the speed information about the automobile to the logic module;
wherein the communication module receives a tachometer information about the automobile from the electronic system;
wherein the communication module forwards the tachometer information about the automobile to the logic module.

3. The display device according to claim 1 wherein the communication module communicates wirelessly with the automobile's electronic system;
wherein the communication module receives the speed information about the automobile from the automobile's electronic system;
wherein the communication module forwards the speed information about the automobile to the logic module.

4. The display device according to claim 1 wherein the communication module is communicates wirelessly with the automobile's electronic system;
wherein the communication module receives the speed information about the automobile from the automobile's electronic system;
wherein the communication module forwards the speed information about the automobile to the logic module;
wherein the communication module receives the tachometer information about the automobile from the electronic system;
wherein the communication module forwards the tachometer information about the automobile to the logic module.

* * * * *